(12) United States Patent
Tanaka (10) Patent No.: US 12,107,625 B2
(45) Date of Patent: Oct. 1, 2024

(54) FAILURE DETECTION DEVICE, FAILURE DETECTION METHOD, AND FAILURE-DETECTION-PROGRAM RECORDING MEDIUM

(71) Applicant: NEC Corporation, Tokyo (JP)

(72) Inventor: Hiroaki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 17/922,829

(22) PCT Filed: May 14, 2020

(86) PCT No.: PCT/JP2020/019242
§ 371 (c)(1),
(2) Date: Nov. 2, 2022

(87) PCT Pub. No.: WO2021/229744
PCT Pub. Date: Nov. 18, 2021

(65) Prior Publication Data
US 2023/0155675 A1     May 18, 2023

(51) Int. Cl.
*H04B 10/08*     (2006.01)
*H04B 10/073*    (2013.01)

(52) U.S. Cl.
CPC .................. *H04B 10/073* (2013.01)

(58) Field of Classification Search
CPC .............. H04B 10/073; H04B 10/0795; H04B 10/07955; H04B 10/5057; H04B 10/564;
(Continued)

(56) References Cited

U.S. PATENT DOCUMENTS

| 6,134,034 A * | 10/2000 | Terahara | H04B 10/564 |
| | | | 398/1 |
| 6,204,945 B1 * | 3/2001 | Iwata | H04J 14/0221 |
| | | | 398/9 |
| 2007/0154216 A1 | 7/2007 | Kim et al. | |

FOREIGN PATENT DOCUMENTS

| JP | H09-64819 A | 3/1997 |
| JP | H10-28106 A | 1/1998 |
(Continued)

OTHER PUBLICATIONS

International Search Report for PCT Application No. PCT/JP2020/019242, mailed on Jul. 28, 2020.
(Continued)

*Primary Examiner* — Hanh Phan
(74) *Attorney, Agent, or Firm* — Sughrue Mion, PLLC (57) ABSTRACT

In order to detect a terminal station in which a failure has occurred in a WDM optical transmission system that transmits optical signals transmitted thereto from a plurality of terminal stations after performing wavelength multiplexing of said optical signals, this failure detection device includes: an input unit that receives first optical signals from the plurality of terminal stations, the first optical signals having wavelengths respectively allocated to the plurality of terminal stations on the basis of allocation information, and that joins the received first optical signals; a monitoring unit that outputs monitoring signals, which are signals that are in accordance with the intensities corresponding to the respective wavelengths of the joined first optical signals; and an identifying unit that identifies a first terminal station from the plurality of terminal stations on the basis of the allocation information and the monitoring signals.

16 Claims, 11 Drawing Sheets

(58) Field of Classification Search
CPC .......... H04B 10/0779; H04B 10/07953; H04B 10/0775; H04B 10/40; H04B 10/0791; H04B 10/0771; H04J 14/02
USPC ........ 398/10, 13, 17, 22, 23, 24, 25, 26, 27, 398/33, 34, 38, 79, 16, 192, 193, 194, 398/195, 196, 197, 45, 48, 49, 162, 136
See application file for complete search history.

(56) References Cited

FOREIGN PATENT DOCUMENTS

| | | |
|---|---|---|
| JP | 2005-269007 A | 9/2005 |
| JP | 2015-220553 A | 12/2015 |
| WO | 2018/051935 A1 | 3/2018 |

OTHER PUBLICATIONS

English translation of Written opinion for PCT Application No. PCT/JP2020/019242, mailed on Jul. 28, 2020.

* cited by examiner

FAILURE DETECTION DEVICE, FAILURE DETECTION METHOD, AND FAILURE-DETECTION-PROGRAM RECORDING MEDIUM

This application is a National Stage Entry of PCT/JP2020/019242 filed on May 14, 2020, the contents of all of which are incorporated herein by reference, in their entirety.

TECHNICAL FIELD

The present invention relates to a failure detection device, a failure detection method, and a failure-detection-program recording medium, and particularly relates to a failure detection device, a failure detection method, and a failure-detection-program recording medium in a wavelength multiplexing optical transmission system.

BACKGROUND ART

Among recent submarine cable systems, "spectrum sharing," in which a plurality of wavelength bands are independently used by a plurality of users, is widespread. In a system in which the spectrum sharing is applied, a land-based MUX/DEMUX receives, from a terminal station of each of the plurality of users, a wavelength-multiplexed optical signal in a band that is allocated for each of the users. The MUX/DEMUX multiplexes these wavelength-multiplexed optical signals at a MUX and thereby generates a WDM signal, and sends out the WDM signal to a submarine cable. MUX/DEMUX is an abbreviation for a multiplexer/demultiplexer. MUX is an abbreviation for a multiplexer. WDM is an abbreviation for wavelength division multiplexing.

The MUX/DEMUX receives the WDM signal transmitted through the submarine cable, and demultiplexes, by using a demultiplexer (DEMUX), the WDM signal into WDM signals each having a wavelength band of each user. The demultiplexed WDM signal is sent out to a terminal station of each of the users.

In relation to the present invention, a technique for power measurement of a WDM signal is described in PTLs 1 and 2.

CITATION LIST

Patent Literature

[PTL 1] International Publication No. WO 2018/051935
[PTL 2] Japanese Unexamined Patent Application Publication No. 2015-220553

SUMMARY OF INVENTION

Technical Problem

In an optical transmission system in which optical signals of a plurality of users are wavelength-multiplexed and then transmitted, for early recovery from a failure, it is desired that a failure in a line between a terminal station of a user and a MUX/DEMUX can be detected for each terminal station (specifically, for each user). However, since the optical signals of the users being transmitted from the terminal stations are multiplexed in a MUX, there is a problem that, in a general WDM optical transmission system, it is difficult to learn, from a multiplexed WDM signal, in which user's line a failure has occurred.

Object of Invention

An object of the present invention is to provide a technique of detecting, in a WDM optical transmission system in which optical signals transmitted by a plurality of terminal stations are wavelength-multiplexed and then transmitted, a terminal station of a line in which a failure has occurred.

Solution to Problem

A failure detection device according to the present invention includes: an input means for receiving, from a plurality of terminal stations, first optical signals each having a wavelength allocated, based on allocation information, to each of the plurality of terminal stations, and for coupling the received first optical signals; a monitoring means for outputting a monitoring signal being a signal according to intensity relevant to a wavelength of each of the coupled first optical signals; and an identification means for identifying a first terminal station from the plurality of terminal stations, based on the allocation information and the monitoring signal.

A failure detection method according to the present invention includes procedures of: receiving, from a plurality of terminal stations, first optical signals each having a wavelength allocated, based on allocation information, to each of the plurality of terminal stations; coupling the received first optical signals; outputting a monitoring signal being a signal according to intensity relevant to a wavelength of each of the coupled first optical signals; and identifying a first terminal station from the plurality of terminal stations, based on the allocation information and the monitoring signal.

A failure-detection-program recording medium according to the present invention records a program causing a computer of a failure detection device to execute: a procedure of receiving, from a plurality of terminal stations, first optical signals each having a wavelength allocated, based on allocation information, to each of the plurality of terminal stations; a procedure of coupling the received first optical signals; a procedure of outputting a monitoring signal being a signal according to intensity relevant to a wavelength of each of the coupled first optical signals; and a procedure of identifying a first terminal station from the plurality of terminal stations, based on the allocation information and the monitoring signal.

Advantageous Effects of Invention

The present invention enables, in a WDM optical transmission system, detection of a terminal station in which a failure has occurred.

EXAMPLE EMBODIMENT

Example embodiments of the present invention are described blow with reference to the drawings. An allow illustrated in the drawings exemplifies a direction of a signal or an order of processing, and no limitation on the direction of a signal or the order of processing is intended. In the example embodiments and the drawings, same reference signs are given to already described elements, and overlapping description is omitted.

First Example Embodiment

Figure 1:
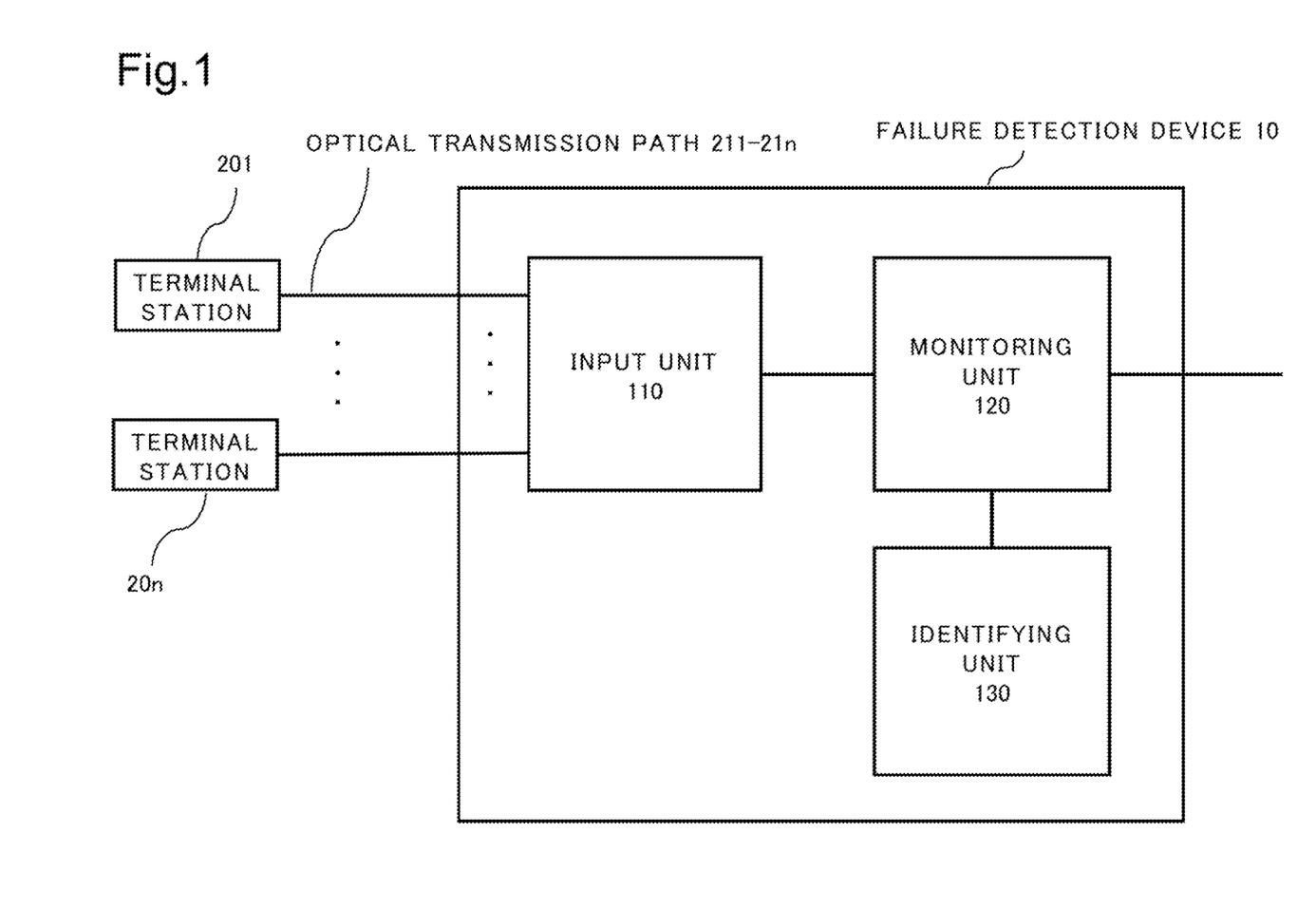
FIG. 1 is a diagram illustrating a configuration example of a failure detection device 10 according to a first example embodiment.

FIG. 1 is a diagram illustrating a configuration example of a failure detection device 10 according to a first example embodiment of the present invention. The failure detection device 10 includes an input unit 110, a monitoring unit 120, and an identifying unit 130. Each of n terminal stations 201 to 20n installed for each user is connected to the input unit 110 via each of optical transmission paths 211 to 21n. N is a natural number equal to or greater than two. The terminal stations 201 to 20n send out optical signals (first optical signals) having a wavelength that is allocated, based on allocation information, for each of the optical signals to the terminal stations to the optical transmission paths 211 to 21n. The wavelengths of the optical signals transmitted by the terminal stations 201 to 20n do not overlap. Specifically, the terminal stations 201 to 20n transmit the first optical signals each having a wavelength allocated for each user in such a way as not to overlap with one another, to the failure detection device 10 via the optical transmission paths 211 to 21n.

The input unit 110 receives the first optical signal from each of the optical transmission paths 211 to 21n, and couples the received first optical signals and outputs the coupled first optical signals. The input unit 110 is one example of an input means. The monitoring unit 120 generates a monitoring signal, and outputs the generated monitoring signal. The monitoring signal is a signal according to intensity at each wavelength of an optical signal included in the first optical signals coupled at the input unit 110. The monitoring unit 120 branches, for example, a part of an input optical signal, converts the branched part of the input signal into a signal having an amplitude indicating intensity of the branched optical signal at each wavelength, and outputs the signal. An optical channel monitor (OCM) commonly used in a WDM optical transmission system may be used as the monitoring unit 120. The monitoring unit 120 is one example of a monitoring means.

The identifying unit 130 has a function of identifying the first terminal station from the plurality of terminal stations, based on the allocation information and the monitoring signal. An identification result (information of the identified first terminal station) may be output to outside of the failure detection device 10, or may be used for internal control of the failure detection device 10. The allocation information may be stored in the identifying unit 130. The identifying unit 130 is one example of an identification means.

Figure 2:
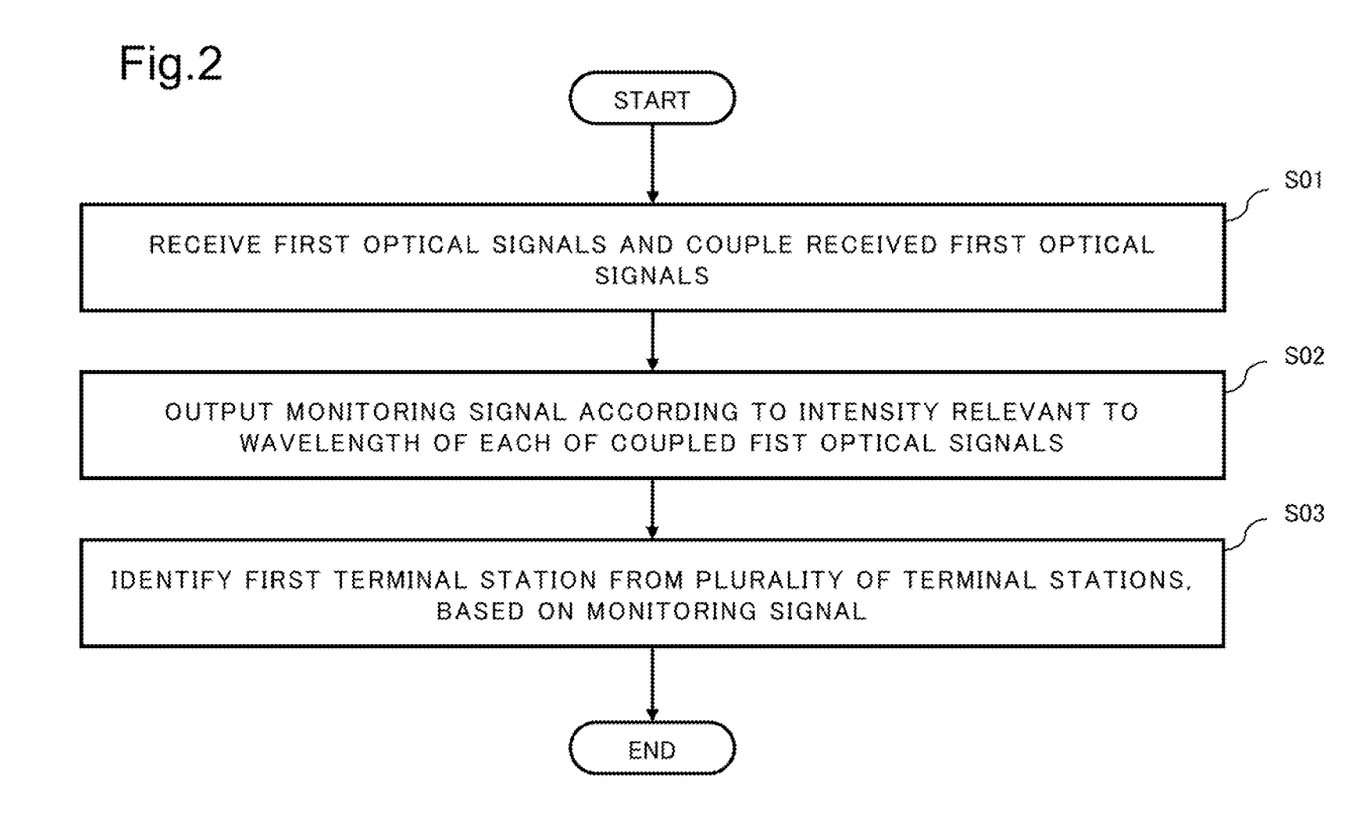
FIG. 2 is a flowchart illustrating an example of an operation process of the failure detection device 10.

FIG. 2 is a flowchart illustrating an example of operation process of the failure detection device 10. The input unit 110 receives first optical signals from the terminal stations 201 to 20n, and couples the received first optical signals (step S01 in FIG. 2). The monitoring unit 120 outputs a monitoring signal according to intensity relevant to a wavelength of each of the first optical signals (step S02). Then, the identifying unit 130 identifies a first terminal station from the plurality of terminal stations, based on the monitoring signal output from the monitoring unit 120.

The failure detection device 10 provided with such a configuration can identify the first terminal station from the plurality of terminal stations, based on the allocation information of a wavelength for a terminal station and the monitoring signal according to intensity relevant to a wavelength of the received optical signal. For example, the failure detection device 10 can identify, according to intensity of the first optical signal indicated by the monitoring signal relevant to a wavelength allocated for a certain terminal station, the terminal station as a terminal station in which a failure has occurred.

Second Example Embodiment

Figure 3:
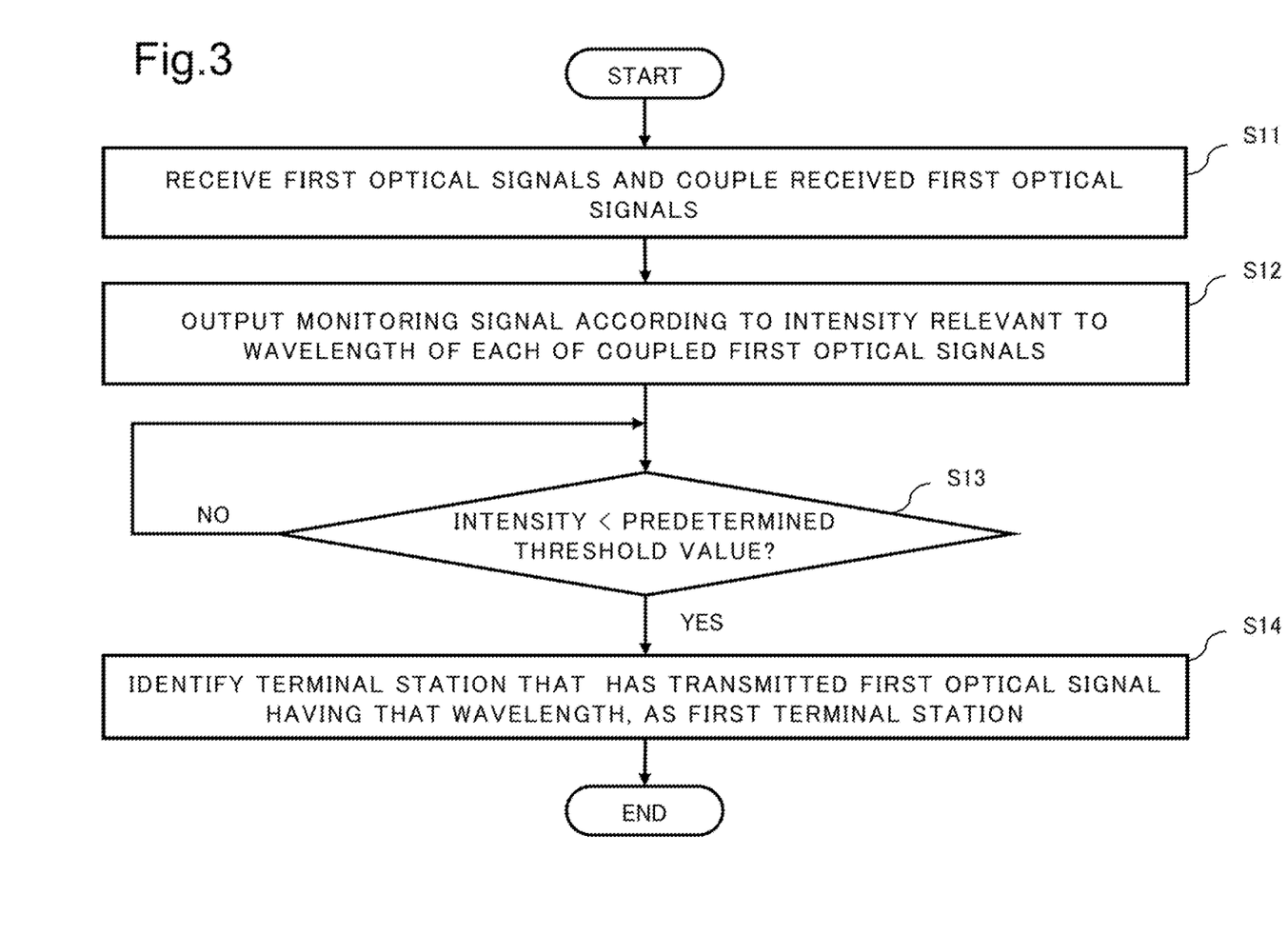
FIG. 3 is a flowchart illustrating an example of an operation process of a failure detection device 10 according to a second example embodiment.

FIG. 3 is a flowchart illustrating an example of an operation process of a failure detection device 10 according to a second example embodiment of the present invention. A configuration of the failure detection device 10 is similar to that in FIG. 1. In the process according to the present example embodiment, an identifying unit 130 compares, for each wavelength allocated for terminal stations 201 to 20n, intensity of a first optical signal indicated by a monitoring signal with a predetermined threshold value. Specifically, an input unit 110 receives the first optical signals from the terminal stations 201 to 20n, and couples the received first optical signals (step S11 in FIG. 3). A monitoring unit 120 outputs a monitoring signal according to intensity relevant to a wavelength of each of the coupled first optical signals (step S12). The identifying unit 130 acquires, from the monitoring signal, the intensity of the first optical signal, and compares the intensity for each wavelength indicated by the monitoring signal with a predetermined threshold value (step S13). When the intensity of the first optical signal at a certain wavelength is less than the predetermined threshold value (step S13: YES), the identifying unit 130 refers to allocation information, searches a terminal station for which the wavelength is allocated, and identifies the searched terminal station as a first terminal station (step S14). When intensity of the first optical signal at the wavelength is equal to or more than the predetermined threshold value (step S13: NO), the identifying unit 130 does not identify the terminal station, and continues the comparison in step S13.

When a failure occurs in any one of the terminal stations 201 to 20n or in any one of optical transmission paths 211 to 21n, it is likely that intensity of the first optical signal transmitted through a path including a point where the failure has occurred decreases. Therefore, when intensity of a wavelength allocated for a certain terminal station becomes less than a predetermined threshold value, the failure detection device 10 can identify, by using the process illustrated in FIG. 3, the terminal station as a terminal station that may affect a user due to a failure.

Note that, each of the first optical signals transmitted by the terminal stations 201 to 20n may be a WDM signal including a plurality of optical carriers. In this case, the monitoring unit 120 outputs a monitoring signal according to intensity of each of the optical carriers included in first optical signals coupled at the input unit 110. For example, the monitoring unit 120 outputs a monitoring signal having an amplitude according to the intensity of each of the optical carriers included in the coupled optical signals. When a plurality of optical carriers having different wavelengths are allocated for a single terminal station, the identifying unit 130 may identify the first terminal station, based on all or some of intensities of the allocated plurality of optical carriers. For example, the identifying unit 130 identifies the first terminal station, based on a maximum value, a minimum value, a median value, or an average value of the intensities of the plurality of optical carriers included in each of the first optical signals received from the terminal stations 201 to 20n.

Third Example Embodiment

Figure 4:
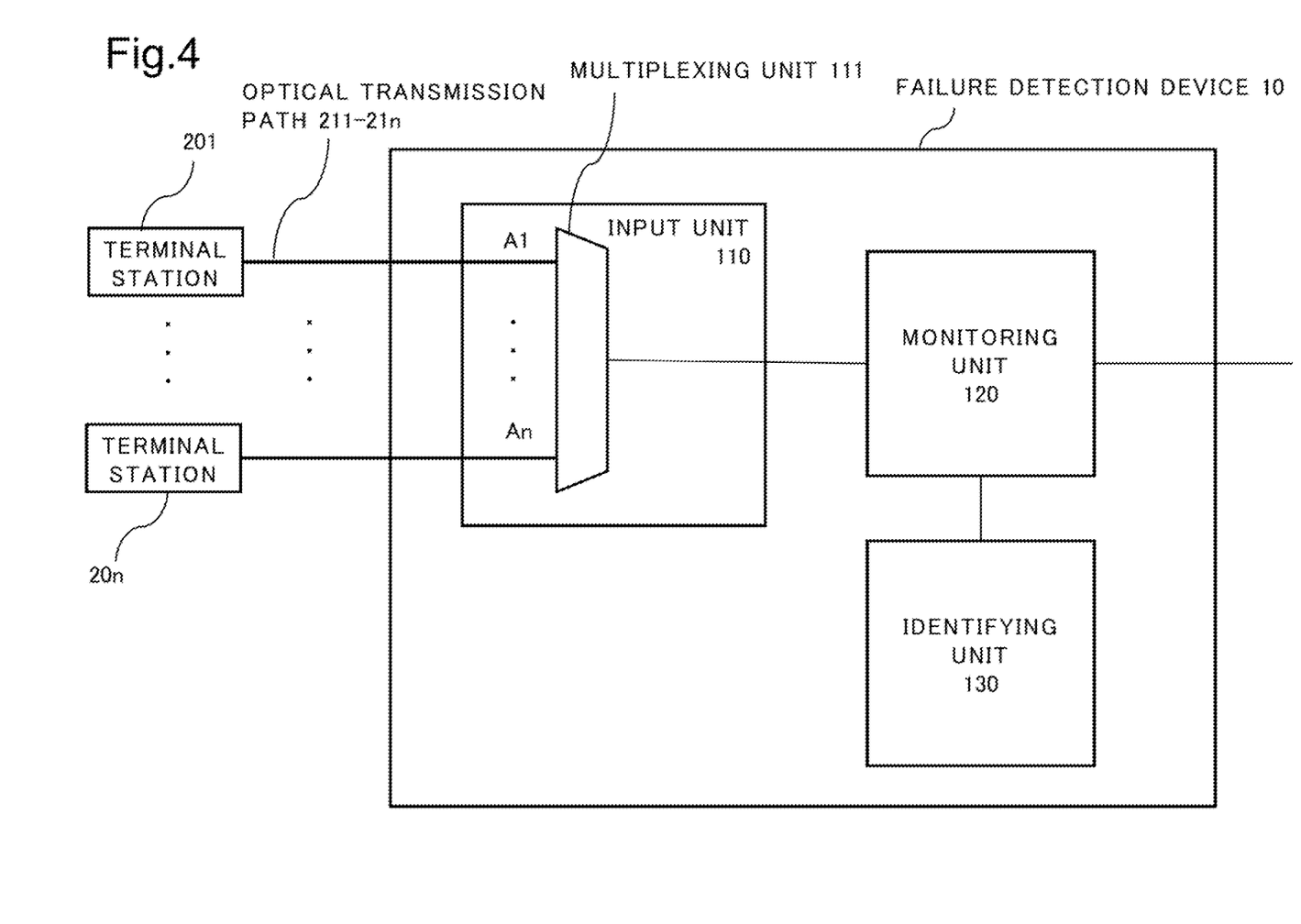
FIG. 4 is a block diagram illustrating a configuration example of a failure detection device 10 according to a third example embodiment.

FIG. 4 is a block diagram illustrating a configuration example of a failure detection device 10 according to a third example embodiment of the present invention. In the present example embodiment, an input unit 110 includes a multiplexing unit 111. The multiplexing unit 111 includes at least n input ports A1 to An, and receives, at each of the input ports A1 to An, each of first optical signals received from terminal stations 201 to 20n. The multiplexing unit 111 couples the received first optical signals and outputs the coupled optical signals to a monitoring unit 120.

The multiplexing unit 111 is a multiplexer (MUX) that is capable of wavelength-multiplexing optical signals having n or more wavelength bands in accordance with allocation information, and is, for example, an arrayed waveguide grating (AWG) or a wavelength selective switch (WSS). When wavelength bands of the first optical signals that are input to the input unit 110 do not overlap, an n×1 optical coupler (star coupler) may be used as the multiplexing unit 111.

Fourth Example Embodiment

Figure 5:
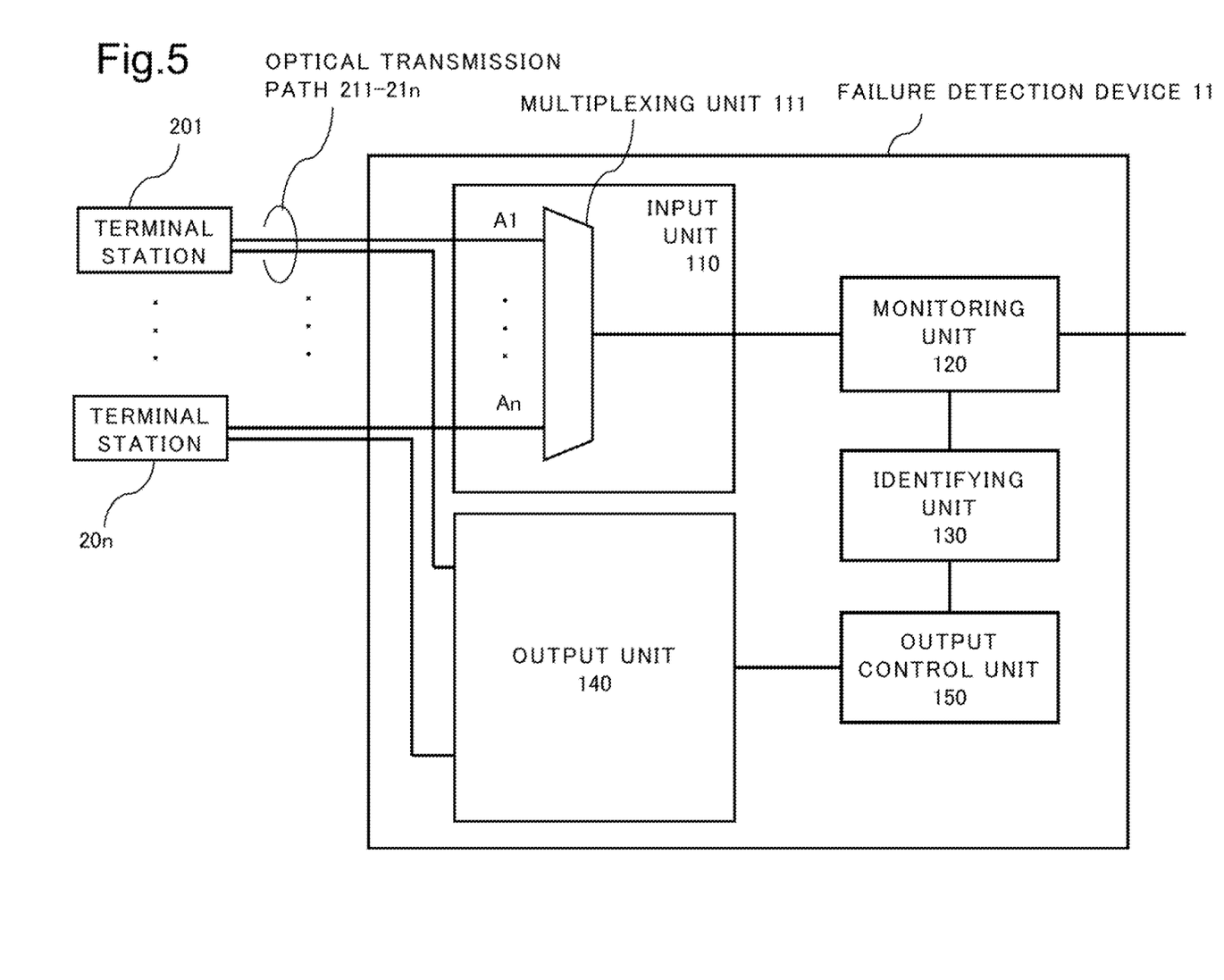
FIG. 5 is a block diagram illustrating a configuration example of a failure detection device 11 according to a fourth example embodiment.

FIG. 5 is a block diagram illustrating a configuration example of a failure detection device 11 according to a fourth example embodiment of the present invention. In the present example embodiment, a form in which optical transmission paths 211 to 21n between a plurality of terminal stations 201-20n and the failure detection device 11 are fiber pairs is described. One fiber pair includes two optical fibers. The two optical fibers are each used for transmission of an optical signal (specifically, a first optical signal) transmitted by a user device and transmission of an optical signal (a second optical signal, which is described later) received by the user device.

When intensity of a first optical signal input to the failure detection device 11 from at least one of the terminal stations 201 to 20n decreases, there may be a failure such as disconnection in an optical transmission path (specifically, a fiber pair) between the terminal station and the failure detection device 11. In order to ensure safety of maintenance work on the fiber pair having a potential failure, it is preferable that output of an optical signal transmitted from the failure detection device 11 to the terminal station via the fiber pair can be stopped. Further in this case, in order to avoid effect on an optical signal transmitted to another terminal station of which fiber pair is normal, it is preferable that transmission of an optical signal to a terminal station can be stopped only for the fiber pair having a potential failure.

The failure detection device 11 includes an output unit 140 and an output control unit 150, in addition to the failure detection device 10 illustrated in FIG. 1. In the present example embodiment, the optical transmission paths 211 to 21n are fiber pairs. One optical fiber included in each of the fiber pairs is connected in such a way as that the first optical signal transmitted by the terminal stations 201 to 20n is received at an input unit 110. The other optical fiber included in each of the fiber pairs is connected in such a way as that an optical signal (second optical signal) output by the output unit 140 is received at the terminal stations 201 to 20n.

The output unit 140 outputs a second optical signal of which destination is each of the terminal stations 201 to 20n. The second optical signal may be an optical signal generated by the failure detection device 11, according to an optical signal received from outside. The second optical signal is transmitted to each of the terminal stations, via the same fiber pair as that for the first optical signal. The second optical signal may be a signal different for each of the terminal stations being a destination. The output unit 140 is one example of an output means.

The output control unit 150 receives information of a first terminal station from an identifying unit 130. The information of the first terminal station includes identification information of the terminal stations 201 to 20n and an instruction to output the second optical signal to the first terminal station or an instruction to stop outputting the second optical signal to the first terminal station. Further, the output control unit 150 instructs the output unit 140 to output the second optical signal to the first terminal station or to stop outputting the second optical signal to the first terminal station. The output control unit 150 is one example of an output control means.

Figure 6:
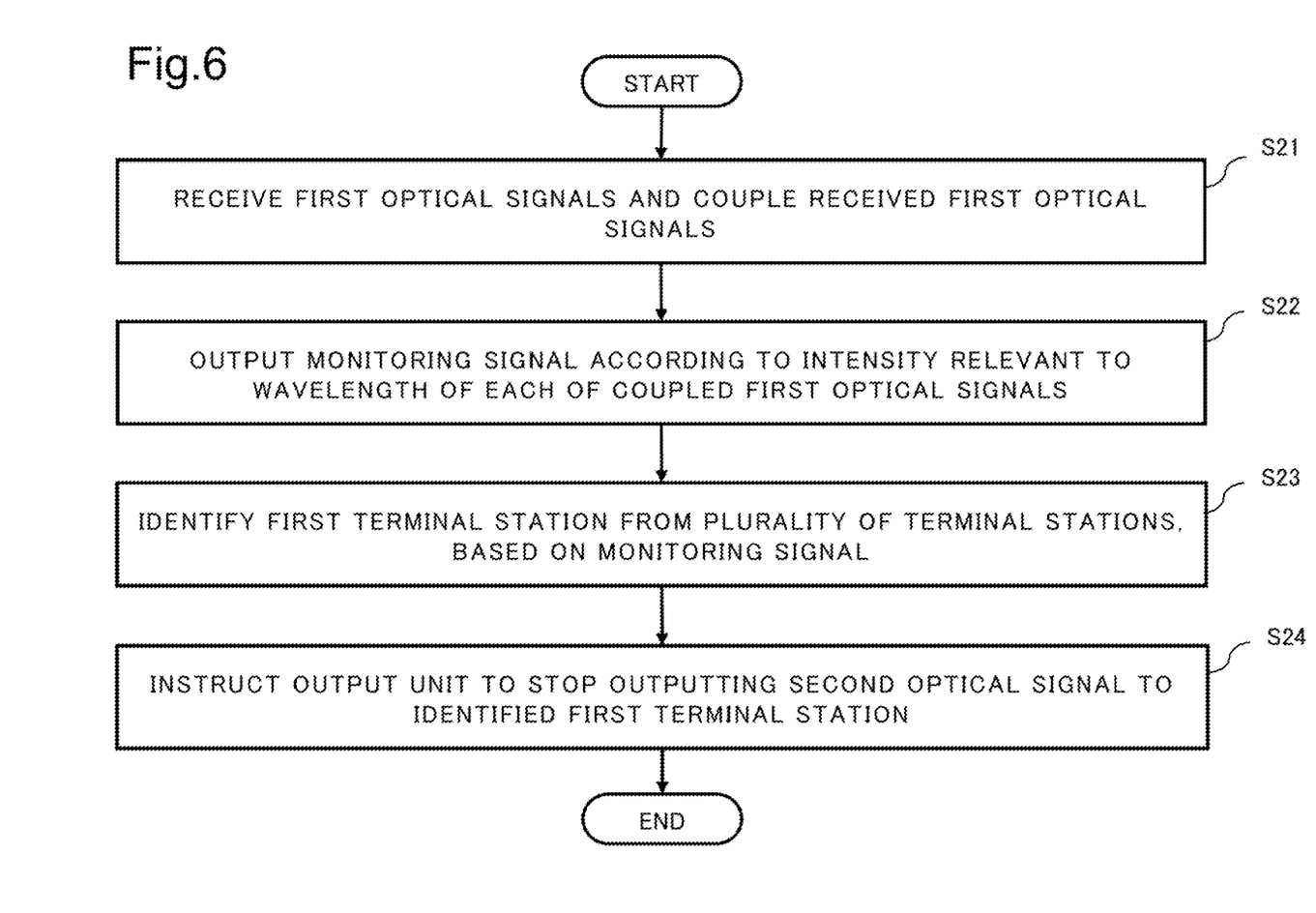
FIG. 6 is a flowchart illustrating an example of an operation process of the failure detection device 11.

FIG. 6 is a flowchart illustrating an example of an operation process of the failure detection device 11. In step S21 to step S23 in FIG. 6, a first terminal station is identified from a plurality of terminal stations, based on a monitoring signal. Step S21 to step S23 is a process similar to that in step S01 to step S03 in FIG. 2 of the first example embodiment. Further, the failure detection device 11 may execute a process in step S11 to step S14 in FIG. 3 instead of the process in step S21 to step S23. The output control unit 150 instructs the output unit 140 to stop outputting the second optical signal to a terminal station identified as the first terminal station (step S24 in FIG. 6).

With such a configuration, the output unit 140 stops output of a second optical signal to the first terminal station. Consequently, the failure detection device 11 can stop transmitting an optical signal to a terminal station only for a fiber pair having a potential failure, while maintaining communication with a terminal station of a user having no failure.

Figure 7:
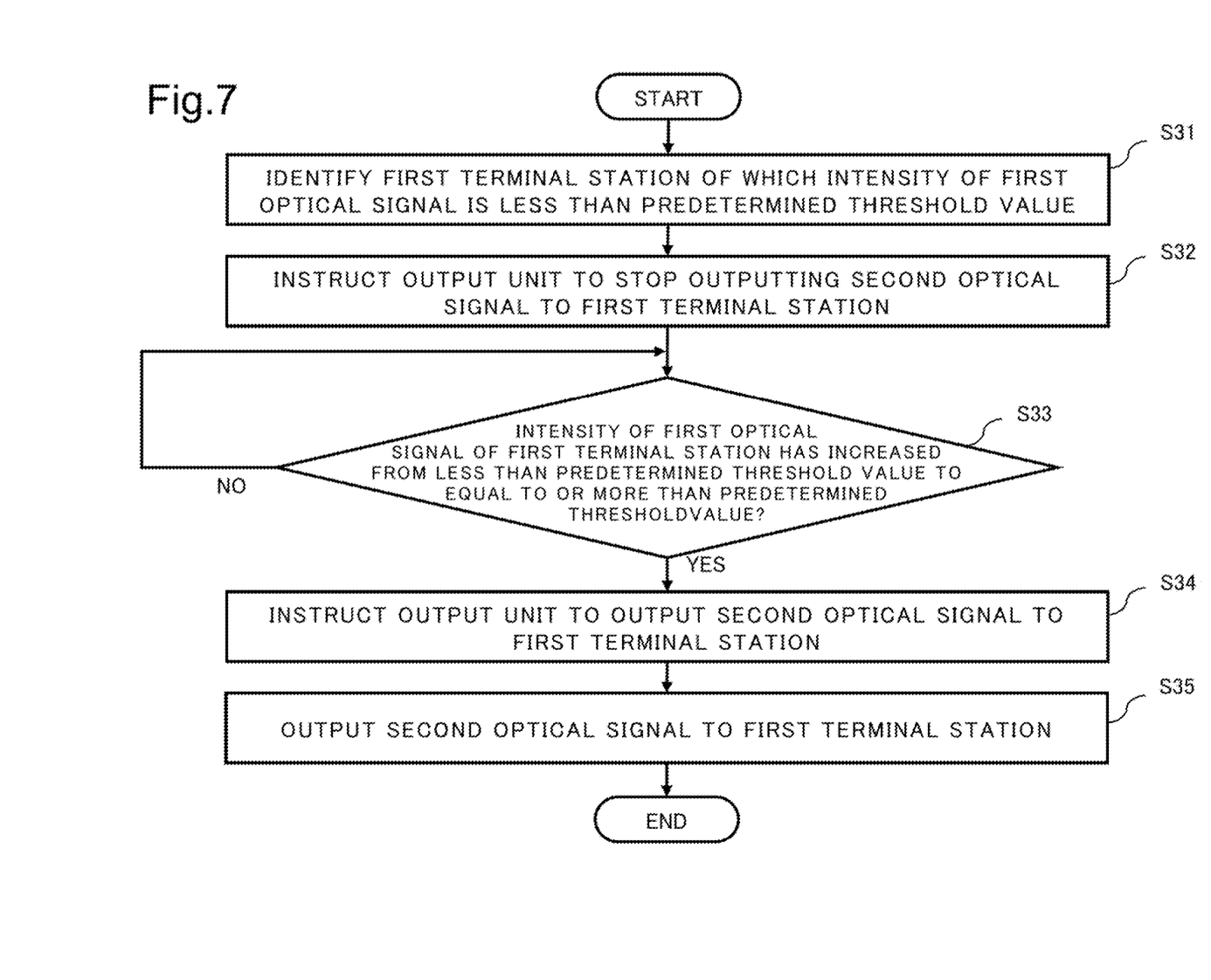
FIG. 7 is a flowchart illustrating another example of an operation process of the failure detection device 11.

FIG. 7 is a flowchart illustrating an example of another operation process of the failure detection device 11. The process in FIG. 7 includes a process of restarting output of a second optical signal to a first terminal station. The identifying unit 130 identifies a first terminal station of which intensity of a first optical signal is less than a predetermined threshold value (step S31 in FIG. 8). The process in steps S11 to S14 in FIG. 3 is applicable to the process of identifying the first terminal station in step S31. The output control unit 150 instructs the output unit to stop outputting the second optical signal to the first terminal station, according to a result of the identification by the identifying unit 130 (step S32).

After step S32, the identifying unit 130 monitors intensity of the first optical signal by using a monitoring signal, and when there is a first terminal station of which intensity of first optical signal has increased to equal to or more than a predetermined threshold value (step S33: YES), notifies the output control unit 150 of information of the first terminal station. This information includes an instruction to output the second optical signal to the first terminal station. The output control unit 150 instructs, in accordance with the notified information, the output unit 140 to output the second optical signal of which destination is the first terminal station (step S34). The output unit 140 outputs, according to the instruction from the output control unit 150, the second optical signal of which destination is the first terminal station (step S35). The identifying unit 130 may exclude, from the first terminal station, the terminal station being the destination of the second optical signal instructed to be output. When there is no first terminal station of which intensity of first optical signal has increased to equal to or more than the predetermined threshold value (step S33: NO), the identifying unit 130 continues the monitoring of intensity of the first optical signal using the monitoring signal. The output control unit 150 is notified of information of the first terminal station.

Fifth Example Embodiment

Figure 8:
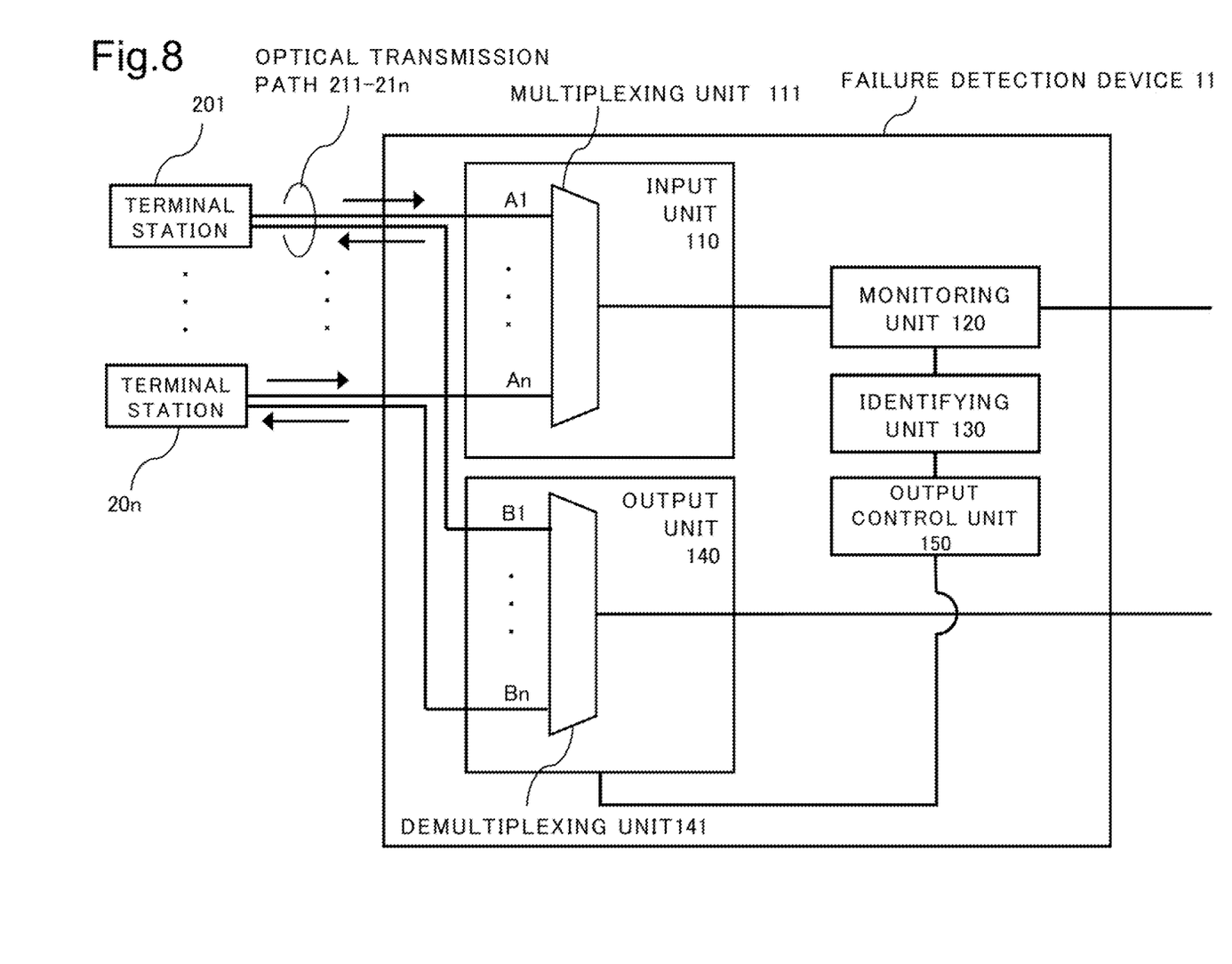
FIG. 8 is a block diagram illustrating an example in which an output unit 140 includes a demultiplexing unit 141.

FIG. 8 is a block diagram illustrating an example in which the output unit 140 of the failure detection device 11 described in the fourth example embodiment includes a demultiplexing unit 141. The demultiplexing unit 141 is a demultiplexer (DEMUX) that separates a WDM signal input from outside the failure detection device 11 by each wavelength, based on allocation information. Further, the demultiplexing unit 141 outputs each of the demultiplexed optical signals as a second optical signal. Generally, the second optical signal is an optical signal that is different for each terminal station being a destination. However, all or some of the second optical signals to the terminal stations may be identical optical signals. The failure detection device 11 transmits the second optical signal output from the demultiplexing unit 141 to terminal stations 201 to 20*n*.

The demultiplexing unit 141 demultiplexes a WDM signal of n or more wavelength bands by each of the bands. For example, the demultiplexing unit 141 includes an AWG or a WSS that is conform to the allocation information. Further, in a case in which the WDM signal input to the demultiplexing unit 141 is distributed to the terminal stations 201 to 20*n* without being demultiplexed, a 1×n optical coupler may be used instead of the demultiplexing unit 141. The 1×n optical coupler is a star coupler that distributes the input WDM signal as n signals.

Figure 9:
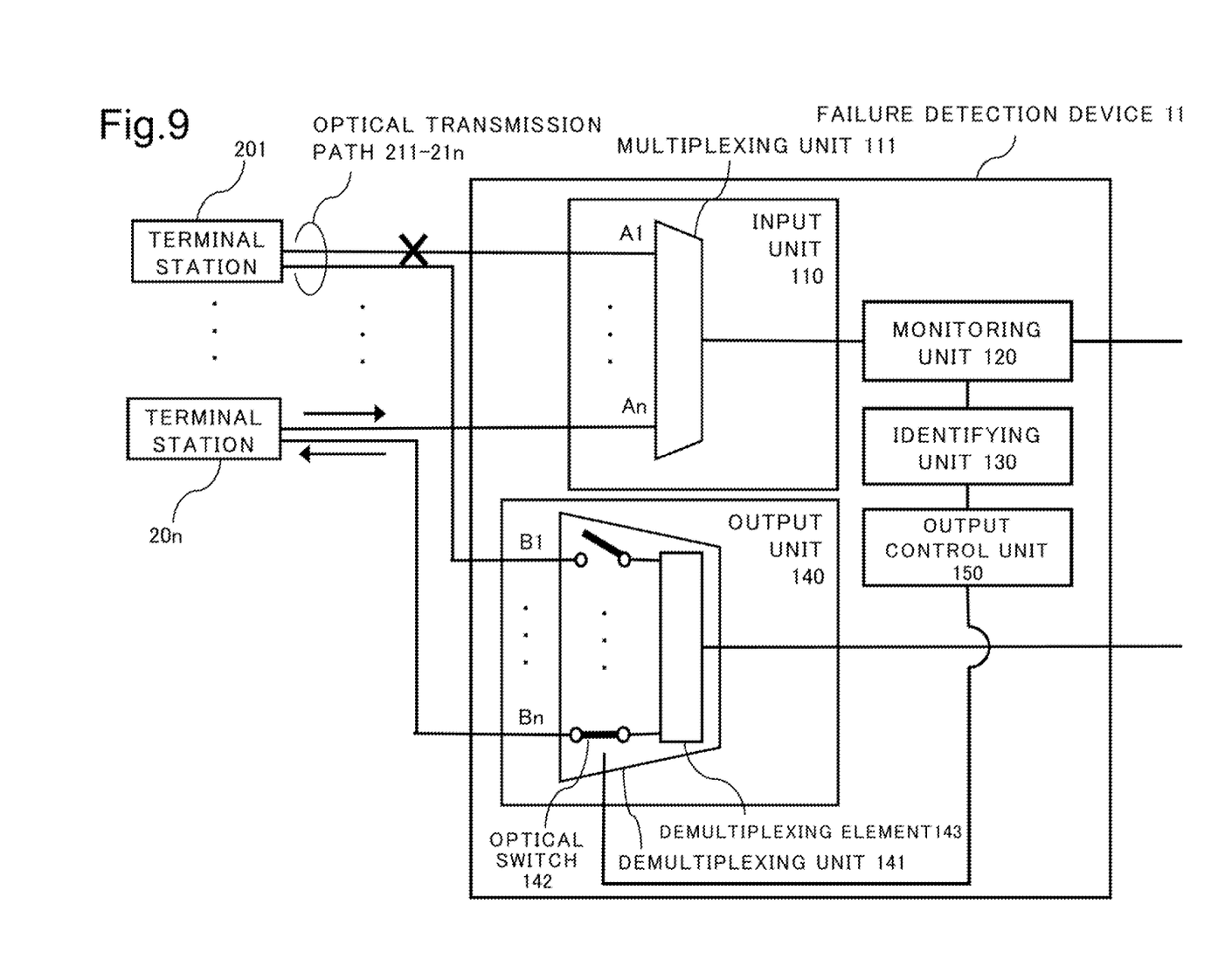
FIG. 9 is a diagram for describing an example of control of the demultiplexing unit 141 by an output control unit 150.

FIG. 9 is a diagram for describing an example of control of the demultiplexing unit 141 by an output control unit 150. The demultiplexing unit 141 illustrated in FIG. 9 includes a demultiplexing element 143 and optical switches 142. The demultiplexing element 143 demultiplexes the input WDM signal into n signals. The optical switches 142 are each provided between n outputs of the demultiplexing element 143 and n output ports B1 to Bn of the demultiplexing unit 141. The output control unit 150 controls the n optical switches 142 independently. According to an instruction from the output control unit 150 to output or to stop outputting the second optical signal, the n optical switches 142 transmit or block each of the demultiplexed second optical signals individually. FIG. 9 illustrates a case in which a failure occurs in an optical transmission path 211 between the terminal station 201 and an input unit 110, and only the output port B1 does not output the second optical signal. The identifying unit 130 detects, based the allocation information and a monitoring signal input from a monitoring unit 120, that intensity of an optical signal having a wavelength that is allocated for the terminal station 201 is less than a predetermined threshold value. Consequently, the identifying unit 130 identifies the terminal station 201 as a first terminal station, and outputs information of the first terminal station to the output control unit 150. In the case illustrated in FIG. 9, the information of the first terminal station includes identification information of the first terminal station (for example, "terminal station 201") and an instruction to stop output of the second optical signal from the output unit 140 to the first terminal station. The output control unit 150 controls, in accordance with the information of the first terminal station, the output port B1 of the demultiplexing unit 141 connected to the optical transmission path 211 to which the terminal station 201 is connected, in such a way as to block the second optical signal.

In this way, transmission of the second optical signal from the output unit 140 to the fiber pair to which the terminal station 201, which transmits the first optical signal having decreased intensity, is connected is stopped. Consequently, safety in repairing the fiber pair is improved. Note that, the terminal station 201 may stop transmitting the first optical signal, by being triggered by loss of the second optical signal. The terminal station 201 stops transmission of the first optical signal, and thereby no optical signal is input from any device to the fiber pair connecting the terminal station 201 to the failure detection device 11. Consequently, safety in repairing the fiber pair can be further improved.

The optical switch 142 may be installed outside the demultiplexing unit 141. Even when the optical switch 142 is external to the demultiplexing unit 141, the optical switch 142 is controlled by the output control unit 150. Further, some WSSs have a function of setting each of n output ports to be valid or to be invalid. When the demultiplexing unit 141 is a WSS having such a function, the output control unit 150 may achieve the function of the optical switch 142 by controlling the function of the WSS. For example, the second optical signal is transmitted to the terminal station 201 connected to the output port B1 by setting the output port B1, which outputs the second optical signal, to be "valid". Further, output of the second optical signal to the terminal station 201 connected to the output port B1 is stopped by setting the output port B1, which outputs the second optical signal, to be "invalid".

As described in the fourth example embodiment, when intensity of the first optical signal from the first terminal station becomes equal to or more than the predetermined threshold value, the identifying unit 130 may instruct the output control unit 150 to cause the demultiplexing unit 141 to restart output of the second optical signal to the first terminal station. Then, the output unit 140 controls, according to an instruction from the output control unit 150, the optical switch 142 in such a way as that the second optical signal is transmitted to the first terminal station.

Sixth Example Embodiment

Figure 10:
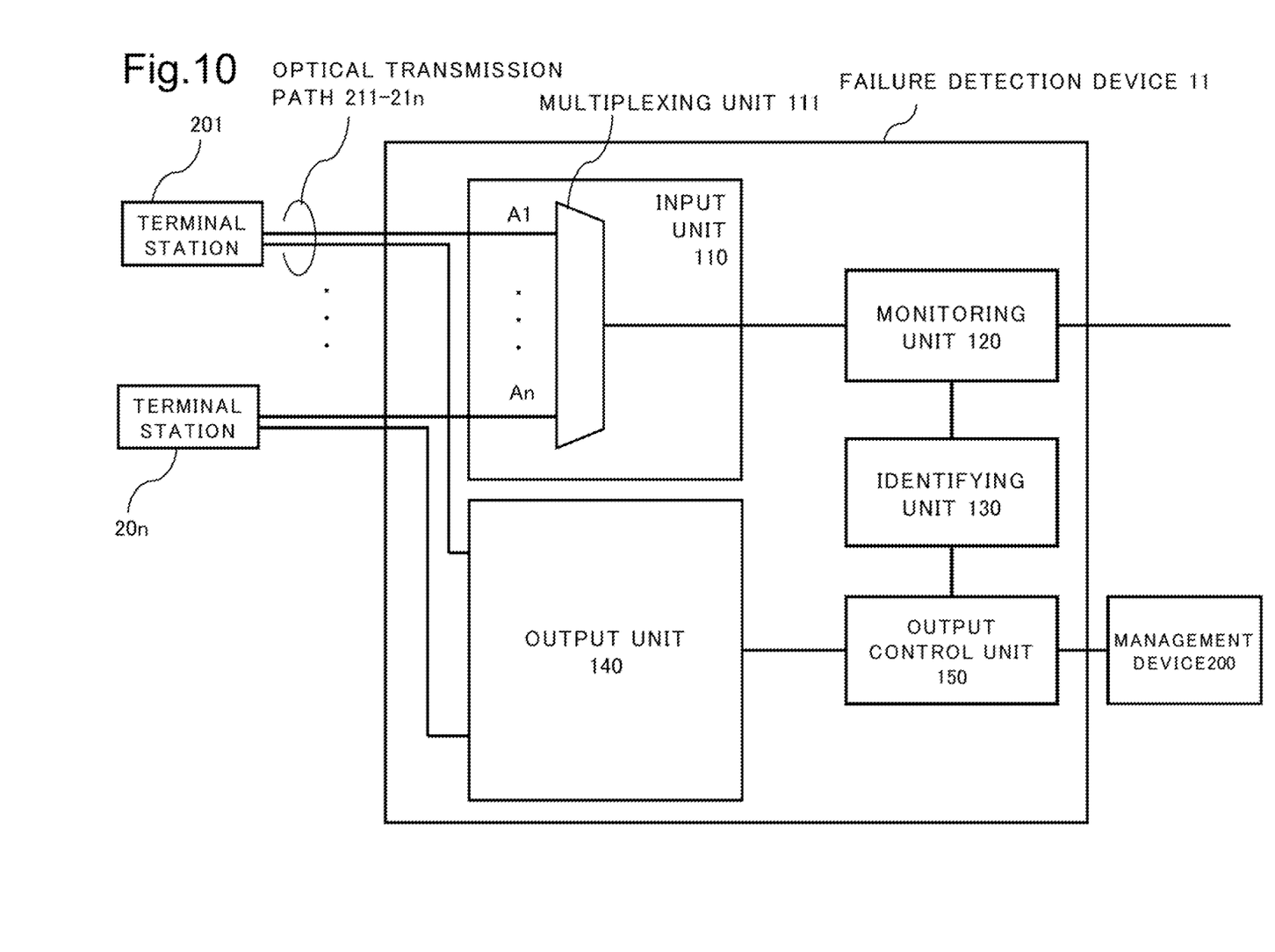
FIG. 10 is a diagram illustrating a sixth example embodiment.

FIG. 10 is a diagram for describing a sixth example embodiment of the present invention. In the present example embodiment, a management device 200 is externally connected to a failure detection device 11. The management device 200 is, for example, a computer, and notifies an output control unit 150 of contents of control on an output unit 140. The management device 200 may be operated by an administrator of a failure detection device 11. The output control unit 150 instructs, according to control from the management device 200, the output unit 140 to start outputting a second optical signal. In the present example embodiment, in a case in which transmission of the second optical signal to a first terminal station is stopped, the transmission of the second optical signal to the first terminal station can be restarted with an instruction from the management device 200 without an instruction for the output control unit 150 from the identifying unit 130.

Seventh Example Embodiment

Figure 11:
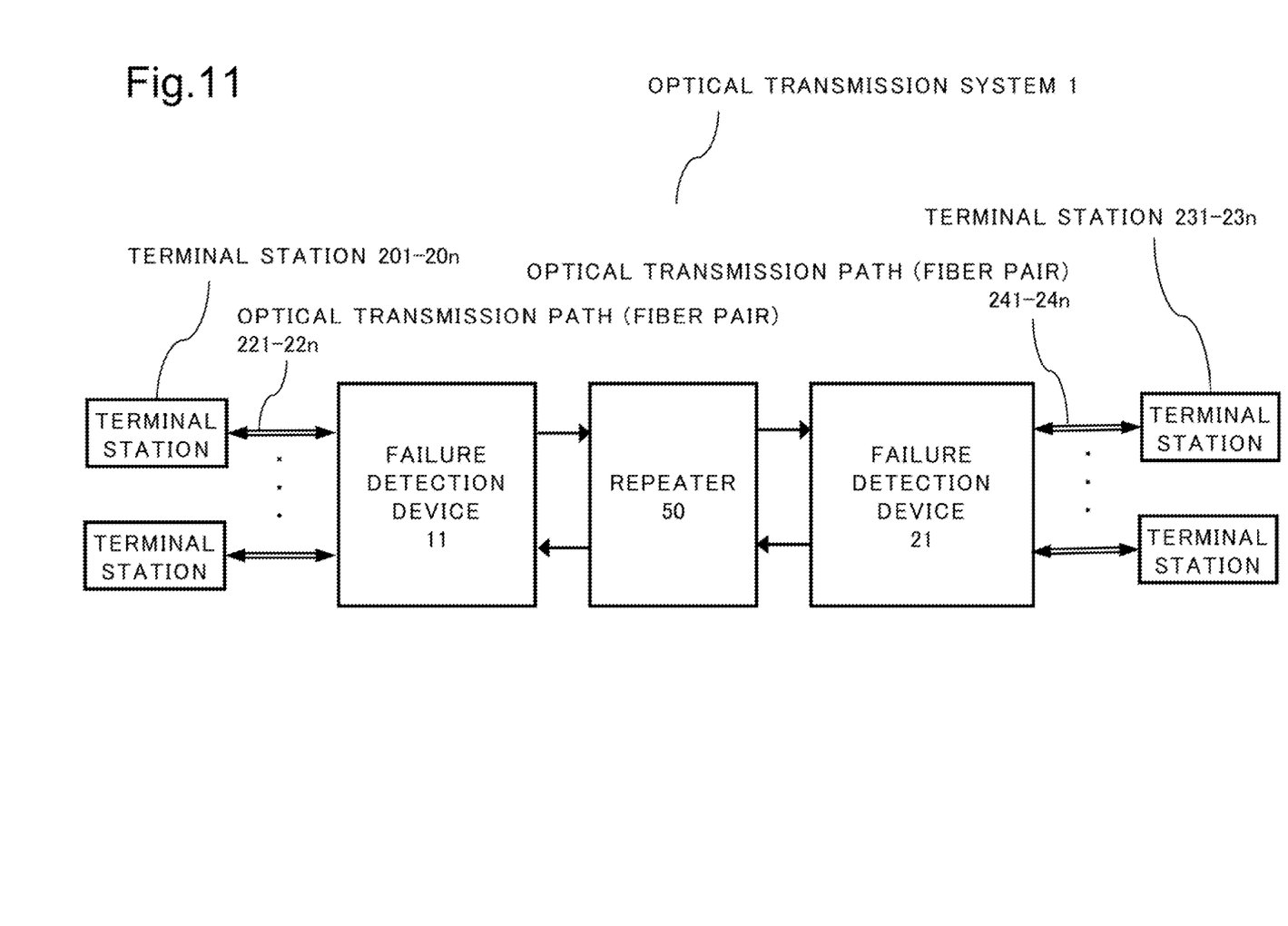
FIG. 11 is a block diagram illustrating a configuration example of an optical transmission system 1 according to a seventh example embodiment.

FIG. 11 is a block diagram illustrating a configuration example of an optical transmission system 1 according to a seventh example embodiment of the present invention. The optical transmission system 1 includes terminal stations 201 to 20*n* and 231 to 23*n*, failure detection devices 11 and 21, and a repeater 50. The terminal stations 201 to 20*n* and the failure detection device 11 have been described in the already-described example embodiments. The terminal stations 201 to 20*n* are each connected to the failure detection device 11 via each of fiber pairs 221 to 22*n*, in such a way as to be able to perform bidirectional communication. The terminal stations 231 to 23*n* and the failure detection device 21 are provided with configurations similar to those of the terminal stations 201 to 20*n* and the failure detection device 11. In the optical transmission system 1, the terminal stations 201 to 20*n* each perform bidirectional communication with each of the terminal stations 231 to 23*n*. Specifically, the failure detection device 11 couples first optical signals transmitted from the terminal stations 201 to 20*n*, and sends out the coupled first optical signals from a monitoring unit 120 to the repeater 50, as a WDM signal. The repeater 50 is a relay device for an optical signal and, for example, amplifies the WDM signal by using an optical amplifier and sends out the amplified WDM signal to the failure detection device 21.

The failure detection device 21 is provided with a configuration similar to that of the failure detection device 11 in FIG. 8. The failure detection device 21 receives the WDM signal sent out by the repeater 50. An output unit 140 included in the failure detection device 21 outputs an optical signal acquired by demultiplexing the WDM signal to the terminal stations 231 to 23*n*, as a second optical signal. Likewise, an optical signal is also transmitted from the terminal stations 231 to 23*n* to the terminal stations 201 to 20*n* via the repeater 50.

The optical transmission system 1 provided with such a configuration includes the failure detection device 11 and the failure detection device 21 having a function similar to that of the failure detection device 11. Therefore, when intensity of an optical signal received by the failure detection device 11 or the failure detection device 21 decreases due to a failure in any one of the fiber pairs 221 to 22*n* and fiber pairs 241 to 24*n*, the optical transmission system 1 can identify a terminal station connected to the optical transmission path in which the failure has occurred. Further, since the optical transmission system 1 can stop transmission of an optical signal from the failure detection device that has identified the terminal station to the identified terminal station, safety when dealing with the failure in the fiber pair can be improved. Further, when intensity of the optical signal from the identified terminal station recovers, the optical transmission system 1 can restart the transmission of the optical signal from the failure detection device to the terminal station.

Note that, the example embodiments of the present invention may be described as the following supplementary notes, but are not limited thereto.

(Supplementary Note 1)

A failure detection device including:
- an input means for receiving, from a plurality of terminal stations, a first optical signal having a wavelength allocated, based on allocation information, to each of the plurality of terminal stations, and for coupling the received first optical signals;
- a monitoring means for outputting a monitoring signal being a signal according to intensity relevant to a wavelength of each of the coupled first optical signals; and
- an identification means for identifying a first terminal station from the plurality of terminal stations, based on the allocation information and the monitoring signal.

(Supplementary Note 2)

The failure detection device according to supplementary note 1, wherein the identification means identifies the first terminal station, according to the monitoring signal indicating that intensity of the first optical signal is less than a predetermined threshold value.

(Supplementary Note 3)

The failure detection device according to supplementary note 1 or 2, wherein
- the first optical signal to be received by the input means is a wavelength-multiplexed optical signal including a plurality of optical carriers, and
- the monitoring signal is a signal according to intensity of each of the plurality of optical carriers included in the first optical signal coupled in the input means.

(Supplementary Note 4)

The failure detection device according to any one of supplementary notes 1 to 3, further including:
- an output means for being capable of outputting a second optical signal to each of the plurality of terminal stations; and
- an output control means for instructing the output means to stop outputting the second optical signal to the first terminal station identified by the identification means.

(Supplementary Note 5)

The failure detection device according to supplementary note 4, wherein the output means includes a demultiplexing means for demultiplexing an input second wavelength-multiplexed optical signal and for outputting, based on the allocation information, each demultiplexed optical signal to the plurality of terminal stations, as the second optical signal.

(Supplementary Note 6)

The failure detection device according to supplementary note 4 or 5, wherein the output control means instructs, when intensity of the first optical signal received from the first terminal station changes from less than the predetermined threshold value to equal to or more than the predetermined threshold value, the output means to start outputting the second optical signal.

(Supplementary Note 7)

The failure detection device according to any one of supplementary notes 4 to 6, wherein the output control means instructs, in response to control from an outside, the output means to start outputting the second optical signal.

(Supplementary Note 8)
An optical transmission system including:
the failure detection device according to any one of supplementary notes 1 to 7; and
the plurality of terminal stations.

(Supplementary Note 9)
A failure detection method including:
receiving, from a plurality of terminal stations, a first optical signal having a wavelength allocated, based on allocation information, to each of the plurality of terminal stations;
coupling the received first optical signals,
outputting a monitoring signal being a signal according to intensity relevant to a wavelength of each of the coupled first optical signals; and
identifying a first terminal station from the plurality of terminal stations, based on the allocation information and the monitoring signal.

(Supplementary Note 10)
The failure detection method according to supplementary note 9, further including identifying the first terminal station, according to the monitoring signal indicating that intensity of the first optical signal is less than a predetermined threshold value.

(Supplementary Note 11)
The failure detection method according to supplementary note 9 or 10, wherein
the first optical signal to be received from the plurality of terminal stations is a wavelength-multiplexed optical signal including a plurality of optical carriers, and
the monitoring signal is a signal according to intensity of each of the plurality of optical carriers included in the coupled first optical signals.

(Supplementary Note 12)
The failure detection method according to any one of supplementary notes 9 to 11, further including instructing stop of outputting a second optical signal to the first terminal station.

(Supplementary Note 13)
The failure detection method according to supplementary note 12, further including demultiplexing an input second wavelength-multiplexed optical signal, and outputting, based on the allocation information, each demultiplexed optical signal to the plurality of terminal stations, as the second optical signal.

(Supplementary Note 14)
The failure detection method according to supplementary note 12 or 13, further including instructing, when intensity of the first optical signal received from the first terminal station changes from less than the predetermined threshold value to equal to or more than the predetermined threshold value, start of outputting the second optical signal.

(Supplementary Note 15)
A failure detection program for causing a computer of a failure detection device to execute:
a procedure of receiving, from a plurality of terminal stations, a first optical signal having a wavelength allocated, based on allocation information, to each of the plurality of terminal stations;
a procedure of coupling the received first optical signals;
a procedure of outputting a monitoring signal being a signal according to intensity relevant to a wavelength of each of the coupled first optical signals; and
a procedure of identifying a first terminal station from the plurality of terminal stations, based on the allocation information and the monitoring signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The configuration described in each example embodiment is not necessarily is not exclusive of one another. Action and the advantageous effect of the present invention may be achieved by a configuration in which all or some of the above-described example embodiments are combined.

The function and the process described in each example embodiment described above may be achieved by a central processing unit (CPU) included in the failure detection device 10 and 11 executing a program. The program is recorded on a tangible, non-transitory storage medium. A semi-conductor memory or a fixed magnetic disk is used as the recording medium, but the recording medium is not limited thereto.

REFERENCE SIGNS LIST

1 Optical transmission system
10, 11, 21 Failure detection device
50 Repeater
110 Input unit
111 Multiplexing unit
120 Monitoring unit
130 Identifying unit
140 Output unit
141 Demultiplexing unit
142 Optical switch
150 Output control unit
200 Management device
201 to 20$n$, 231 to 23$n$ Terminal station
211 to 21$n$ Optical transmission path
221 to 22$n$, 241 to 24$n$ Fiber pair

What is claimed is:
1. A failure detection device comprising:
an input circuit configured to receive, from a plurality of terminal stations, a first optical signal having a wavelength allocated, based on allocation information, to each of the plurality of terminal stations, and couple the received first optical signals;
a monitor configured to output a monitoring signal being a signal according to intensity relevant to a wavelength of each of the coupled first optical signals;
an identifier configured to identify a first terminal station from the plurality of terminal stations, based on the allocation information and the monitoring signal;
an output circuit configured to be capable of outputting a second optical signal to each of the plurality of terminal stations; and
an output controller configured to instruct the output circuit to stop outputting the second optical signal to the first terminal station identified by the identifier.

2. The failure detection device according to claim 1, wherein the identifier identifies the first terminal station, according to the monitoring signal indicating that intensity of the first optical signal is less than a predetermined threshold value.

3. The failure detection device according to claim 2, wherein the output controller instructs, when intensity of the first optical signal received from the first terminal station changes from less than the predetermined threshold value to equal to or more than the predetermined threshold value, the output circuit to start outputting the second optical signal.

4. The failure detection device according to claim 2, wherein
the first optical signal to be received by the input circuit is a wavelength-multiplexed optical signal including a plurality of optical carriers, and
the monitoring signal is a signal according to intensity of each of the plurality of optical carriers included in the first optical signal coupled in the input circuit.

5. The failure detection device according to claim 2, further comprising:
an output circuit configured to be capable of outputting a second optical signal to each of the plurality of terminal stations; and
an output controller configured to instruct the output circuit to stop outputting the second optical signal to the first terminal station identified by the identifier.

6. The failure detection device according to claim 1, wherein
the first optical signal to be received by the input circuit is a wavelength-multiplexed optical signal including a plurality of optical carriers, and
the monitoring signal is a signal according to intensity of each of the plurality of optical carriers included in the first optical signal coupled in the input circuit.

7. The failure detection device according to claim 6, further comprising:
an output circuit configured to be capable of outputting a second optical signal to each of the plurality of terminal stations; and
an output controller configured to instruct the output circuit to stop outputting the second optical signal to the first terminal station identified by the identifier.

8. The failure detection device according to claim 1, wherein the output circuit includes a demultiplexer configured to demultiplex an input second wavelength-multiplexed optical signal and output, based on the allocation information, each demultiplexed optical signal to the plurality of terminal stations, as the second optical signal.

9. The failure detection device according to claim 1, wherein the output controller instructs, in response to control from an outside, the output circuit to start outputting the second optical signal.

10. An optical transmission system comprising:
the failure detection device according to claim 1; and
the plurality of terminal stations.

11. A failure detection method comprising:
receiving, from a plurality of terminal stations, a first optical signal having a wavelength allocated, based on allocation information, to each of the plurality of terminal stations;
coupling the received first optical signals;
outputting a monitoring signal being a signal according to intensity relevant to a wavelength of each of the coupled first optical signals;
identifying a first terminal station from the plurality of terminal stations, based on the allocation information and the monitoring signal; and
instructing to stop outputting a second optical signal to the first terminal station.

12. The failure detection method according to claim 11, further comprising identifying the first terminal station, according to the monitoring signal indicating that intensity of the first optical signal is less than a predetermined threshold value.

13. The failure detection method according to claim 12, further comprising instructing, when intensity of the first optical signal received from the first terminal station changes from less than the predetermined threshold value to equal to or more than the predetermined threshold value, start of outputting the second optical signal.

14. The failure detection method according to claim 11, wherein
the first optical signal to be received from the plurality of terminal stations is a wavelength-multiplexed optical signal including a plurality of optical carriers, and
the monitoring signal is a signal according to intensity of each of the plurality of optical carriers included in the coupled first optical signals.

15. The failure detection method according to claim 11, further comprising demultiplexing an input second wavelength-multiplexed optical signal, and outputting, based on the allocation information, each demultiplexed optical signal to the plurality of terminal stations, as the second optical signal.

16. A tangible and non-transitory recording medium storing a failure detection program when executed by a computer causing the computer of a failure detection device to execute:
a procedure of receiving, from a plurality of terminal stations, a first optical signal having a wavelength allocated, based on allocation information, to each of the plurality of terminal stations;
a procedure of coupling the received first optical signals;
a procedure of outputting a monitoring signal being a signal according to intensity relevant to a wavelength of each of the coupled first optical signals;
a procedure of identifying a first terminal station from the plurality of terminal stations, based on the allocation information and the monitoring signal; and
a procedure of instructing to stop outputting a second optical signal to the first terminal station.

* * * * *